(12) United States Patent
Johnsen et al.

(10) Patent No.: US 9,900,293 B2
(45) Date of Patent: Feb. 20, 2018

(54) SYSTEM AND METHOD FOR SUPPORTING AUTOMATIC DISABLING OF DEGRADED LINKS IN AN INFINIBAND (IB) NETWORK

(75) Inventors: Bjørn-Dag Johnsen, Oslo (NO); Dag Georg Moxnes, Oslo (NO); Predrag Hodoba, Heggedal (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/488,250

(22) Filed: Jun. 4, 2012

(65) Prior Publication Data

US 2012/0311143 A1    Dec. 6, 2012

Related U.S. Application Data

(60) Provisional application No. 61/493,330, filed on Jun. 3, 2011.

(51) Int. Cl.
*H04L 29/06* (2006.01)
*H04L 12/931* (2013.01)
(Continued)

(52) U.S. Cl.
CPC ........ *H04L 63/0442* (2013.01); *H04L 9/3234* (2013.01); *H04L 9/3271* (2013.01);
(Continued)

(58) Field of Classification Search
CPC . H04L 63/0876; H04L 9/3234; H04L 63/083; H04L 63/0442; H04L 9/3271
(Continued)

(56) References Cited

U.S. PATENT DOCUMENTS

| 5,805,805 A | 9/1998 | Civanlar et al. |
| 5,964,837 A | 10/1999 | Chao |

(Continued)

FOREIGN PATENT DOCUMENTS

| CN | 1567827 | 1/2005 |
| CN | 1728664 | 2/2006 |

(Continued)

OTHER PUBLICATIONS

Tom Shanley, Infiniband Network Architecture (excerpt), chapter—Detailed Description of the Link Layer, Pearson Education, published 2002, p. 390-392, 485, 491-493, 537-539.*
Shanley, Infiniband Network Architecture, Pearson Education, published Oct. 2002 p. 387-394.*
Shanley, Infiniband Network Architecture, Pearson Education, published Oct. 2002 p. 8-9, 391-396, 549-551.*
International Search Report dated Sep. 26, 2013 for Application No. PCT/US2013/040656, 10 pages.

(Continued)

*Primary Examiner* — Douglas Blair
*Assistant Examiner* — Joseph M Cousins
(74) *Attorney, Agent, or Firm* — Tucker Ellis LLP

(57) ABSTRACT

A system and method can support automatic disabling of degraded links in an InfiniBand (IB) network. At least one node in a fabric can monitor one or more local ports of the at least one node for one or more error states associated with a link at the at least one node, wherein the link is connected to a local port of the at least one node. The at least one node further allows a subnet manager to observe the one or more error states associated with the link at the at least one node, and allows the subnet manager to set the link in a basic state if the observed error states exceed a threshold. In this basic state, the link allows only SMP traffic and prevents data traffic and non-SMP based management traffic.

19 Claims, 3 Drawing Sheets

(51) Int. Cl.
*H04L 12/24* (2006.01)
*H04L 9/32* (2006.01)

(52) U.S. Cl.
CPC .............. *H04L 41/12* (2013.01); *H04L 49/20* (2013.01); *H04L 63/083* (2013.01); *H04L 63/0876* (2013.01)

(58) Field of Classification Search
USPC ........................................................ 709/224
See application file for complete search history.

(56) References Cited

U.S. PATENT DOCUMENTS

| | | |
|---|---|---|
| 6,014,669 A | 1/2000 | Slaughter |
| 6,091,706 A | 7/2000 | Shaffer |
| 6,202,067 B1 | 3/2001 | Blood |
| 6,463,470 B1 | 10/2002 | Mohaban |
| 6,594,759 B1 | 7/2003 | Wang |
| 6,647,419 B1 | 11/2003 | Mogul |
| 6,678,835 B1 | 1/2004 | Shah |
| 6,748,429 B1 | 6/2004 | Talluri et al. |
| 6,829,685 B2 | 12/2004 | Neal |
| 6,904,545 B1 | 6/2005 | Erimli |
| 6,941,350 B1 | 9/2005 | Frazier et al. |
| 6,963,932 B2 | 11/2005 | Bhat |
| 6,978,300 B1 | 12/2005 | Beukema et al. |
| 6,981,025 B1 | 12/2005 | Frazier et al. |
| 6,985,956 B2 | 1/2006 | Luke et al. |
| 7,023,811 B2 | 4/2006 | Pinto |
| 7,069,468 B1 | 6/2006 | Olson |
| 7,113,995 B1 | 9/2006 | Beukema |
| 7,185,025 B2 | 2/2007 | Rosenstock et al. |
| 7,194,540 B2 | 3/2007 | Aggarwal |
| 7,200,704 B2 | 4/2007 | Njoku et al. |
| 7,216,163 B2 | 5/2007 | Sinn |
| 7,221,676 B2 | 5/2007 | Green |
| 7,231,518 B1 | 6/2007 | Bakke |
| 7,290,277 B1 | 10/2007 | Chou et al. |
| 7,302,484 B1 | 11/2007 | Stapp |
| 7,356,841 B2 | 4/2008 | Wilson et al. |
| 7,398,394 B1 | 7/2008 | Johnsen et al. |
| 7,409,432 B1 | 8/2008 | Recio et al. |
| 7,437,447 B2 | 10/2008 | Brey et al. |
| 7,493,409 B2 | 2/2009 | Craddock et al. |
| 7,500,236 B2 | 3/2009 | Janzen |
| 7,633,955 B1 | 12/2009 | Saraiya et al. |
| 7,634,608 B2 | 12/2009 | Droux et al. |
| 7,636,772 B1 | 12/2009 | Kirby |
| 7,653,668 B1 | 1/2010 | Shelat |
| 7,685,385 B1 | 3/2010 | Choudhary et al. |
| 7,724,748 B2 | 5/2010 | Davis |
| 7,783,788 B1 | 8/2010 | Quinn et al. |
| 7,843,822 B1 | 11/2010 | Paul et al. |
| 7,853,565 B1 | 12/2010 | Liskov |
| 7,860,961 B1 | 12/2010 | Finkelstein et al. |
| 7,873,711 B2 | 1/2011 | Adams et al. |
| 7,953,890 B1 | 5/2011 | Katkar |
| 8,184,555 B1 | 5/2012 | Mouton |
| 8,214,558 B1 | 7/2012 | Sokolov |
| 8,214,653 B1 | 7/2012 | Marr |
| 8,234,407 B2 | 7/2012 | Sugumar |
| 8,291,148 B1 | 10/2012 | Shah et al. |
| 8,327,437 B2 | 12/2012 | McAlister |
| 8,331,381 B2 | 12/2012 | Brown et al. |
| 8,335,915 B2 | 12/2012 | Plotkin et al. |
| 8,423,780 B2 | 4/2013 | Plotkin et al. |
| 8,549,281 B2 | 10/2013 | Samovskiy et al. |
| 8,583,921 B1 | 11/2013 | Shu |
| 8,635,318 B1 | 1/2014 | Shankar |
| 8,769,152 B2 | 7/2014 | Gentieu |
| 8,924,952 B1 | 12/2014 | Hou |
| 8,935,206 B2 | 1/2015 | Aguilera |
| 8,935,333 B2 | 1/2015 | Beukema |
| 8,972,966 B2 | 3/2015 | Kelso |
| 2002/0059597 A1 | 5/2002 | Kikinis et al. |
| 2002/0120720 A1 | 8/2002 | Moir |
| 2002/0143914 A1 | 10/2002 | Cihula |
| 2002/0188711 A1 | 12/2002 | Meyer |
| 2002/0198755 A1 | 12/2002 | Birkner |
| 2003/0009487 A1 | 1/2003 | Prabakaran et al. |
| 2003/0009551 A1 | 1/2003 | Benfield |
| 2003/0033427 A1 | 2/2003 | Brahmaroutu |
| 2003/0065775 A1 | 4/2003 | Aggarwal |
| 2003/0093509 A1 | 5/2003 | Li et al. |
| 2003/0105903 A1 | 6/2003 | Garnett et al. |
| 2003/0115276 A1 | 6/2003 | Flaherty |
| 2003/0120852 A1 | 6/2003 | McConnell et al. |
| 2003/0208572 A1 | 11/2003 | Shah et al. |
| 2004/0022245 A1 | 2/2004 | Forbes |
| 2004/0031052 A1 | 2/2004 | Wannamaker |
| 2004/0068501 A1 | 4/2004 | McGoveran |
| 2004/0090925 A1 | 5/2004 | Schoeberl |
| 2004/0139083 A1 | 7/2004 | Hahn |
| 2004/0153849 A1* | 8/2004 | Tucker et al. ................... 714/43 |
| 2004/0162973 A1 | 8/2004 | Rothman |
| 2004/0193768 A1 | 9/2004 | Carnevale |
| 2004/0199764 A1 | 10/2004 | Koechling et al. |
| 2004/0220947 A1 | 11/2004 | Aman |
| 2004/0249928 A1 | 12/2004 | Jacobs et al. |
| 2004/0255286 A1 | 12/2004 | Rothman |
| 2005/0025520 A1 | 2/2005 | Murakami |
| 2005/0044363 A1 | 2/2005 | Zimmer et al. |
| 2005/0071382 A1 | 3/2005 | Rosenstock |
| 2005/0071709 A1 | 3/2005 | Rosenstock et al. |
| 2005/0086342 A1 | 4/2005 | Burt |
| 2005/0091396 A1 | 4/2005 | Nilakantan et al. |
| 2005/0105554 A1 | 5/2005 | Kagan et al. |
| 2005/0125520 A1 | 6/2005 | Hanson |
| 2005/0182701 A1 | 8/2005 | Cheston |
| 2005/0182831 A1 | 8/2005 | Uchida |
| 2005/0182853 A1 | 8/2005 | Lewites et al. |
| 2005/0198164 A1 | 9/2005 | Moore et al. |
| 2005/0198250 A1 | 9/2005 | Wang |
| 2005/0213608 A1 | 9/2005 | Modi |
| 2005/0273641 A1 | 12/2005 | Sandven et al. |
| 2006/0079278 A1 | 4/2006 | Ferguson et al. |
| 2006/0112297 A1 | 5/2006 | Davidson |
| 2006/0114863 A1 | 6/2006 | Sanzgiri |
| 2006/0117103 A1 | 6/2006 | Brey |
| 2006/0136735 A1 | 6/2006 | Plotkin |
| 2006/0168192 A1 | 7/2006 | Sharma |
| 2006/0177103 A1 | 8/2006 | Hildreth |
| 2006/0195560 A1 | 8/2006 | Newport |
| 2006/0221975 A1 | 10/2006 | Lo |
| 2007/0016694 A1 | 1/2007 | Achler |
| 2007/0050763 A1 | 3/2007 | Kagan |
| 2007/0110245 A1 | 5/2007 | Sood |
| 2007/0129917 A1 | 6/2007 | Blevins |
| 2007/0195774 A1 | 8/2007 | Sherman |
| 2007/0195794 A1 | 8/2007 | Fujita |
| 2007/0206735 A1 | 9/2007 | Silver et al. |
| 2007/0253328 A1 | 11/2007 | Harper |
| 2008/0031266 A1 | 2/2008 | Tallet et al. |
| 2008/0144614 A1 | 6/2008 | Fisher et al. |
| 2008/0183853 A1 | 7/2008 | Manion et al. |
| 2008/0184332 A1 | 7/2008 | Gerkis |
| 2008/0192750 A1 | 8/2008 | Ko |
| 2008/0201486 A1 | 8/2008 | Hsu |
| 2008/0209018 A1 | 8/2008 | Hernandez |
| 2008/0229096 A1 | 9/2008 | Alroy et al. |
| 2008/0250125 A1 | 10/2008 | Brey et al. |
| 2008/0288646 A1 | 11/2008 | Hasha |
| 2008/0310421 A1 | 12/2008 | Teisberg |
| 2008/0310422 A1 | 12/2008 | Booth |
| 2009/0049164 A1 | 2/2009 | Mizuno |
| 2009/0116404 A1 | 5/2009 | Mahop |
| 2009/0141728 A1 | 6/2009 | Brown |
| 2009/0178033 A1 | 7/2009 | Challener |
| 2009/0216853 A1 | 8/2009 | Burrow |
| 2009/0249472 A1 | 10/2009 | Litvin |
| 2009/0271472 A1 | 10/2009 | Scheifler |
| 2009/0307499 A1 | 12/2009 | Senda |
| 2009/0327462 A1 | 12/2009 | Adams et al. |
| 2010/0014526 A1 | 1/2010 | Chavan |

(56) References Cited

U.S. PATENT DOCUMENTS

| | | | |
|---|---|---|---|
| 2010/0020806 A1 | 1/2010 | Vandat | |
| 2010/0080117 A1* | 4/2010 | Coronado et al. | 370/217 |
| 2010/0082853 A1 | 4/2010 | Block | |
| 2010/0114826 A1 | 5/2010 | Voutilainen | |
| 2010/0138532 A1 | 6/2010 | Glaeser et al. | |
| 2010/0142544 A1 | 6/2010 | Chapel et al. | |
| 2010/0166167 A1 | 7/2010 | Karimi-Cherkandi et al. | |
| 2010/0235488 A1 | 9/2010 | Sharma | |
| 2010/0268857 A1* | 10/2010 | Bauman et al. | 710/74 |
| 2010/0306772 A1 | 12/2010 | Arnold et al. | |
| 2011/0022574 A1 | 1/2011 | Hansen | |
| 2011/0072206 A1 | 3/2011 | Ross et al. | |
| 2011/0110366 A1 | 5/2011 | Moore et al. | |
| 2011/0138082 A1 | 6/2011 | Khatri | |
| 2011/0138185 A1 | 6/2011 | Ju | |
| 2011/0173302 A1 | 7/2011 | Rider | |
| 2011/0179195 A1 | 7/2011 | O'Mullan | |
| 2011/0209202 A1 | 8/2011 | Otranen | |
| 2011/0222492 A1 | 9/2011 | Borsella et al. | |
| 2011/0283017 A1 | 11/2011 | Alkhatib | |
| 2011/0307886 A1 | 12/2011 | Thanga | |
| 2012/0005480 A1 | 1/2012 | Batke | |
| 2012/0039331 A1* | 2/2012 | Astigarraga et al. | 370/389 |
| 2012/0195417 A1 | 8/2012 | Hua et al. | |
| 2012/0239928 A1 | 9/2012 | Judell | |
| 2012/0290698 A1 | 11/2012 | Alroy et al. | |
| 2013/0041969 A1 | 2/2013 | Falco | |
| 2013/0046904 A1 | 2/2013 | Hilland | |
| 2013/0138836 A1 | 5/2013 | Cohen et al. | |
| 2013/0159865 A1 | 6/2013 | Smith et al. | |
| 2013/0179870 A1 | 7/2013 | Kelso | |
| 2013/0191622 A1 | 7/2013 | Sasaki | |
| 2014/0095853 A1 | 4/2014 | Sarangshar | |
| 2014/0095876 A1 | 4/2014 | Smith | |

FOREIGN PATENT DOCUMENTS

| | | |
|---|---|---|
| CN | 101123498 A | 2/2008 |
| EP | 2 051 436 A1 | 4/2009 |
| EP | 2160068 A1 | 3/2010 |
| JP | 2002247089 | 8/2002 |
| JP | 2004166263 | 6/2004 |
| JP | 2005522774 | 7/2005 |
| JP | 2006157285 | 6/2006 |
| JP | 2007501563 | 1/2007 |
| JP | 200854214 | 3/2008 |
| JP | 2009510953 | 3/2009 |
| WO | 01/90838 A2 | 11/2001 |
| WO | 2006016698 | 2/2006 |
| WO | 2008099479 | 8/2008 |
| WO | 2012037518 A1 | 3/2012 |

OTHER PUBLICATIONS

International Search Report dated Sep. 23, 2013 for Application No. PCT/US2013/040639, 10 pages.

InfiniBand$^{SM}$ Trade Association, InfiniBand™ Architecture Specification, vol. 1, Release 1.2.1, Nov. 2007, pp. 1-1727.

European Patent Office, International Searching Authority, International Search Report and Written Opinion dated Sep. 12, 2012 for Application No. PCT/US2012/040775, 13 pages.

Lee, M., Security Enhancement in Infiniband Architecture, Apr. 2005, IEEE, vol. 19, pp. 1-18.

Aurelio Bermudez, On the InfiniBand Subnet Discovery Process, IEEE The Computer Society 2003, pp. 1-6.

Tom Shanley, Infiniband Network Architecture, Pearson Education 2002, p. 559, 561.

Shanley, Tom, Infiniband Network Architecture (excerpt), Pearson Education, published 2002, p. 209-211, 393-394, 551, 554.

Kashyap, RFC 4392: IP over InfiniBand Architecture, Apr. 2006, pp. 1-22.

Shanley, et al, Infiniband Network Architecture, Oct. 2002, pp. 83-87, 95-102, 205-208, 403-406, Pearson Education.

State Intellectual Property Office of the People's Republic of China, Search Report for Chinese Patent Application No. 201180039850.7, May 5, 2015, 2 pages.

Shanley, InfiniBand Network Architecture (exerpt), 2002, pp. 204-209, 560-564, Pearson Education.

Shanley, Infiniband Network Architecture, (excerpt), 2002, p. 213, Pearson Education.

State Intellectual Property Office of the People's Republic of China, Search Report for Chinese Patent Application No. 201280027279.1, Office Action dated Sep. 9, 2015, 2 pages.

Shanley, Tom, "Infiniband Network Architecture" (Excerpt), Copyright 2002 by Mindshare, Inc., p. 86-87.

United States Patent and Trademark Office, Office Action dated Apr. 18, 2017 for U.S. Appl. No. 13/235,113, 30 pages.

European Patent Office, Communication Pursuant to Article 94(3) EPC, dated Mar. 8, 2017 for European Patent Application No. 11767106.5, 10 pages.

United States Patent and Trademark Office, Notice of Allowance and Fee(s) dated Oct. 26, 2017 for U.S. Appl. No. 13/235,130, 10 pages.

Ching-Min Lin et al., "A New Quorum-Based Scheme for Managing Replicated Data in Distributed Systems" IEEE Transactions on Computers, vol. 51, No. 12, Dec. 2002, 6 pages.

United States Patent and Trademark Office, Office Action dated Nov. 16, 2017 for U.S. Appl. No. 13/235,113, 28 pages.

United States Patent and Trademark Office, Office Communication dated Nov. 30, 2017 for U.S. Appl. No. 13/235,130, 3 pages.

* cited by examiner

SYSTEM AND METHOD FOR SUPPORTING
AUTOMATIC DISABLING OF DEGRADED
LINKS IN AN INFINIBAND (IB) NETWORK

CLAIM OF PRIORITY

This application claims the benefit of priority on U.S. Provisional Patent Application No. 61/493,330, entitled "STATEFUL SUBNET MANAGER FAILOVER IN A MIDDLEWARE MACHINE ENVIRONMENT" filed Jun. 3, 2011, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to supporting an InfiniBand (IB) network.

BACKGROUND

The interconnection network plays a beneficial role in the next generation of super computers, clusters, and data centers. High performance network technology, such as the InfiniBand (IB) technology, is replacing proprietary or low-performance solutions in the high performance computing domain, where high bandwidth and low latency are the key requirements. For example, IB installations are used in supercomputers such as Los Alamos National Laboratory's Roadrunner, Texas Advanced Computing Center's Ranger, and Forschungszentrum Juelich's JuRoPa.

IB was first standardized in October 2000 as a merge of two older technologies called Future I/O and Next Generation I/O. Due to its low latency, high bandwidth, and efficient utilization of host-side processing resources, it has been gaining acceptance within the High Performance Computing (HPC) community as a solution to build large and scalable computer clusters. The de facto system software for IB is OpenFabrics Enterprise Distribution (OFED), which is developed by dedicated professionals and maintained by the OpenFabrics Alliance. OFED is open source and is available for both GNU/Linux and Microsoft Windows.

SUMMARY

Described herein is a system and method that can support automatic disabling of degraded links in an InfiniBand (IB) network. At least one node in a fabric can monitor one or more local ports of the at least one node for one or more error states associated with a link at the at least one node, wherein the link is connected to a local port of the at least one node. The at least one node further allows a subnet manager to observe the one or more error states associated with the link at the at least one node, and allows the subnet manager to set the link in a basic state if the observed error states exceed a threshold. In this basic state, the link allows only SMP traffic and prevents data traffic and non-SMP based management traffic.

DETAILED DESCRIPTION

Described herein is a system and method that can support automatic disabling of degraded links in an interconnected network, such as an InfiniBand (IB) network.

Figure 1:
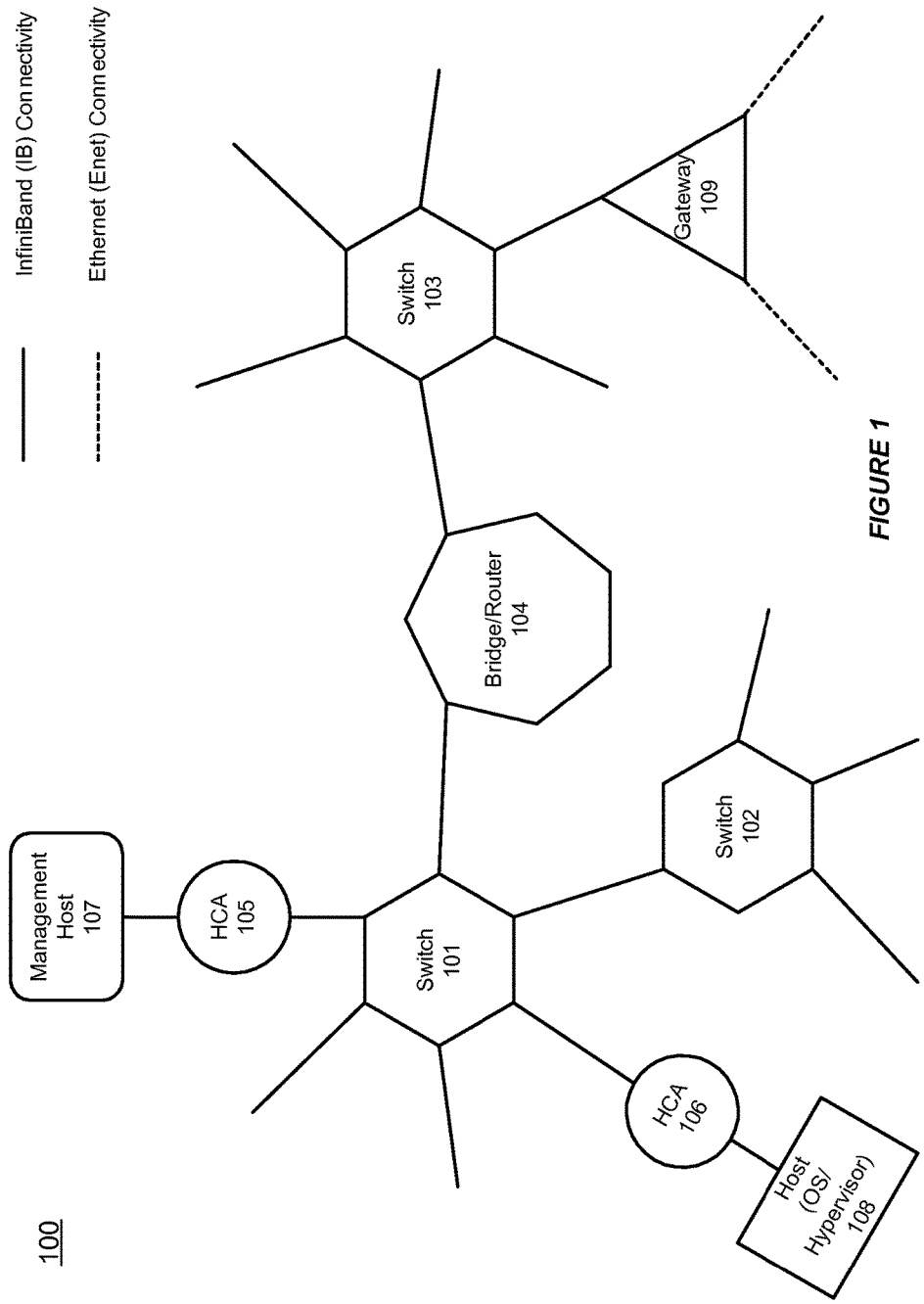
FIG. 1 shows an illustration of a fabric model in a middleware environment in accordance with an embodiment of the invention.

FIG. 1 shows an illustration of a fabric model in a middleware environment in accordance with an embodiment of the invention. As shown in FIG. 1, an interconnected network, or a fabric 100, can include switches 101-103, bridges and routers 104, host channel adapters (HCAs) 105-106 and designated management hosts 107. Additionally, the fabric can include, or be connected to, one or more hosts 108 that are not designated management hosts.

The designated management hosts 107 can be installed with HCAs 105, 106, a network software stack and relevant management software in order to perform network management tasks. Furthermore, firmware and management software can be deployed on the switches 101-103, and the bridges and routers 104 to direct traffic flow in the fabric. Here, the host HCA drivers, OS and Hypervisors on hosts 108 that are not designated management hosts may be considered outside the scope of the fabric from a management perspective.

The fabric 100 can be in a single media type, e.g. an IB only fabric, and be fully connected. The physical connectivity in the fabric ensures in-band connectivity between any fabric components in the non-degraded scenarios. Alternatively, the fabric can be configured to include Ethernet (Enet) connectivity outside gateway (GW) external ports on a gateway 109. Additionally, it is also possible to have independent fabrics operating in parallel as part of a larger system. For example, the different fabrics can only be indirectly connected via different HCAs or HCA ports.

InfiniBand (IB) Architecture

IB architecture is a serial point-to-point technology. Each of the IB networks, or subnets, can include a set of hosts interconnected using switches and point-to-point links. A single subnet can be scalable to more than ten-thousand nodes and two or more subnets can be interconnected using an IB router. The hosts and switches within a subnet are addressed using local identifiers (LIDs), e.g. a single subnet may be limited to 49151 unicast addresses.

An IB subnet can employ at least one subnet manager (SM) which is responsible for initializing and starting up the sub-net including the configuration of all the IB ports residing on switches, routers and host channel adapters (HCAs) in the subset. The SM's responsibility also includes routing table calculation and deployment. Routing of the network aims at obtaining full connectivity, deadlock freedom, and load balancing between all source and destination pairs. Routing tables can be calculated at network initialization time and this process can be repeated whenever the topology changes in order to update the routing tables and ensure optimal performance.

At the time of initialization, the SM starts in the discovering phase where the SM does a sweep of the network in order to discover all switches and hosts. During the discovering phase, the SM may also discover any other SMs present and negotiate who should be the master SM. When the discovering phase is completed, the SM can enter a master phase. In the master phase, the SM proceeds with LID assignment, switch configuration, routing table calculations and deployment, and port configuration. At this point, the subnet is up and ready to use.

After the subnet is configured, the SM can monitor the network for changes (e.g. a link goes down, a device is added, or a link is removed). If a change is detected during the monitoring process, a message (e.g. a trap) can be forwarded to the SM and the SM can reconfigure the network. Part of the reconfiguration process, or a heavy sweep process, is the rerouting of the network which can be performed in order to guarantee full connectivity, deadlock freedom, and proper load balancing between all source and destination pairs.

The HCAs in an IB network can communicate with each other using queue pairs (QPs). A QP is created during the communication setup, and a set of initial attributes such as QP number, HCA port, destination LID, queue sizes, and transport service are supplied. On the other hand, the QP associated with the HCAs in a communication is destroyed when the communication is over. An HCA can handle many QPs, each QP consists of a pair of queues, a send queue (SQ) and a receive queue (RQ). There is one such pair present at each end-node that is participating in the communication. The send queue holds work requests to be transferred to the remote node, while the receive queue holds information on what to do with the data received from the remote node. In addition to the QPs, each HCA can have one or more completion queues (CQs) that are associated with a set of send and receive queues. The CQ holds completion notifications for the work requests posted to the send and receive queue.

The IB architecture is a flexible architecture. Configuring and maintaining an IB subnet can be carried out via special in-band subnet management packets (SMPs). The functionalities of a SM can, in principle, be implemented from any node in the IB subnet. Each end-port in the IB subnet can have an associated subnet management agent (SMA) that is responsible for handling SMP based request packets that are directed to it. In the IB architecture, a same port can represent a SM instance or other software component that uses SMP based communication. Thus, only a well defined sub-set of SMP operations can be handled by the SMA.

SMPs use dedicated packet buffer resources in the fabric, e.g. a special virtual lane (VL15) that is not flow-controlled (i.e. SMP packets may be dropped in the case of buffer overflow. Also, SMPs can use either the routing that the SM sets up based on end-port Local Identifiers (LIDs), or SMPs can use direct routes where the route is fully defined by the sender and embedded in the packet. Using direct routes, the packet's path goes through the fabric in terms of an ordered sequence of port numbers on HCAs and switches.

The SM can monitor the network for changes using SMAs that are presented in every switch and/or every HCA. The SMAs communicate changes, such as new connections, disconnections, and port state change, to the SM using traps and notices. A trap is a message sent to alert end-nodes about a certain event. A trap can contain a notice attribute with the details describing the event. Different traps can be defined for different events. In order to reduce the unnecessary distribution of traps, IB applies an event forwarding mechanism where end-nodes are required to explicitly subscribe to the traps they want to be informed about.

The subnet administrator (SA) is a subnet database associated with the master SM to store different information about a subnet. The communication with the SA can help the end-node to establish a QP by sending a general service management datagram (MAD) through a designated QP, .e.g. QP1. Both sender and receiver require information such as source/destination LIDs, service level (SL), maximum transmission unit (MTU), etc. to establish communication via a QP. This information can be retrieved from a data structure known as a path record that is provided by the SA. In order to obtain a path record, the end-node can perform a path record query to the SA, e.g. using the SubnAdmGet/SubnAdmGetable operation. Then, the SA can return the requested path records to the end-node.

The IB architecture provides partitions as a way to define which IB end-ports should be allowed to communicate with other IB end-ports. Partitioning is defined for all non-SMP packets on the IB fabric. The use of partitions other than the default partition is optional. The partition of a packet can be defined by a 16 bit P_Key that consists of a 15 bit partition number and a single bit member type (full or limited).

The partition membership of a host port, or an HCA port, can be based on the premise that the SM sets up the P_Key table of the port with P_Key values that corresponds to the current partition membership policy for that host. In order to compensate for the possibility that the host may not be fully trusted, the IB architecture also defines that switch ports can optionally be set up to do partition enforcement. Hence, the P_Key tables of switch ports that connect to host ports can then be set up to reflect the same partitions as the host port is supposed to be a member of (i.e. in essence equivalent to switch enforced VLAN control in Ethernet LANs).

Since the IB architecture allows full in-band configuration and maintenance of an IB subnet via SMPs, the SMPs themselves are not subject to any partition membership restrictions. Thus, in order to avoid the possibility that any rough or compromised node on the IB fabric is able to define an arbitrary fabric configuration (including partition membership), other protection mechanisms are needed.

M_Keys can be used as the basic protection/security mechanism in the IB architecture for SMP access. An M_Key is a 64 bit value that can be associated individually with each individual node in the IB subnet, and where incoming SMP operations may be accepted or rejected by the target node depending on whether the SMP includes the correct M_Key value (i.e. unlike P_Keys, the ability to specify the correct M_Key value—like a password—represents the access control).

By using an out-of-band method for defining M_Keys associated with switches, it is possible to ensure that no host node is able to set up any switch configuration, including partition membership for the local switch port. Thus, an M_Key value is defined when the switch IB links becomes operational. Hence, as long as the M_Key value is not compromised or "guessed" and the switch out-of-band access is secure and restricted to authorized fabric administrators, the fabric is secure.

Furthermore, the M_Key enforcement policy can be set up to allow read-only SMP access for all local state information except the current M_Key value. Thus, it is possible to protect the switch based fabric from un-authorized (re-)

configuration, and still allow host based tools to perform discovery and diagnostic operations.

The flexibility provided by the IB architecture allows the administrators of IB fabrics/subnets, e.g. HPC clusters, to decide whether to use embedded SM instances on one or more switches in the fabric and/or set up one or more hosts on the IB fabric to perform the SM function. Also, since the wire protocol defined by the SMPs used by the SMs is available through APIs, different tools and are commands can be implemented based on use of such SMPs for discovery, diagnostics and control independently of any current Subnet Manager operation.

From a security perspective, the flexibility of IB architecture indicates that there is no fundamental difference between root access to the various hosts connected to the IB fabric and the root access allowing access to the IB fabric configuration. This is fine for systems that are physically secure and stable. However, this can be problematic for system configurations where different hosts on the IB fabric are controlled by different system administrators, and where such hosts should be logically isolated from each other on the IB fabric.

Automatic Disabling of Degraded Links

When IB links are disabled due to excessive error rates, it is difficult to observe the current error rates of the link, or to perform additional testing to further diagnose or characterize the problem. If a repair action is performed to correct the problem, e.g. by replacing a cable or correcting the seating of a cable connector, then the link needs to be enabled before it can be tested, in which case the subnet manager may also enable/use the link for normal data traffic.

Automated logic can be used to determine whether there are excessive error rates. This automated logic also can disable the link when there are excessive error rates. Since the link has been completely disabled, it is no longer possible to use the link for basic connectivity such as supporting management operations between IB nodes. However, the link may still be capable of being used for supporting management operations between IB nodes, even when a link is not reliable enough for normal data traffic. Additionally, there may be no corresponding automated operation to enable the link again as a result of detecting a significantly lower error rate over a significant period of time.

In accordance with an embodiment of the invention, the fabric can ensure that severely degraded links are not used for data traffic. The fabric allows for the definition of basic policies for automatic disabling of degraded links based on associated error rate thresholds. The fabric also allows for the specification of policies to automatically define degraded links that are in a non-routable state and to have the SM automatically observe this state.

Furthermore, subnet level error reporting can be supported in the fabric. The subnet level error reporting can be beneficial in terms of ensuring the states that the SM monitors are coherent, or consistent. The SM can be aware of the error state, and/or the explicit disabled state, that are associated with the links or with the pair of ports that each link represents.

Additionally, a local daemon can take the problem link out of normal service as soon as possible without permanently disabling it. For example, the local daemon can reset the link, instead of disabling the link, or marking the link as a bad link and leaving it up to the SM to take further action (i.e. potentially with longer reaction time). By resetting the link, the local daemon allows the normal data traffic to be disabled right away, and there may not be any delay for waiting for the SM to change the link state. Thus, resetting the link, rather than disabling the link, can bring the link to the same basic state as the SM can use initially. Furthermore, the SM can request the link to be enabled again and then keep the link in a basic state or at least not allow the link to be used for data traffic, even in the case where the local daemon disables the link. Here, the disabling of a link may remove the last link between the SM and the relevant node (where the daemon operates), in which case the SM may not be able to request for the enabling of the link.

Figure 2:
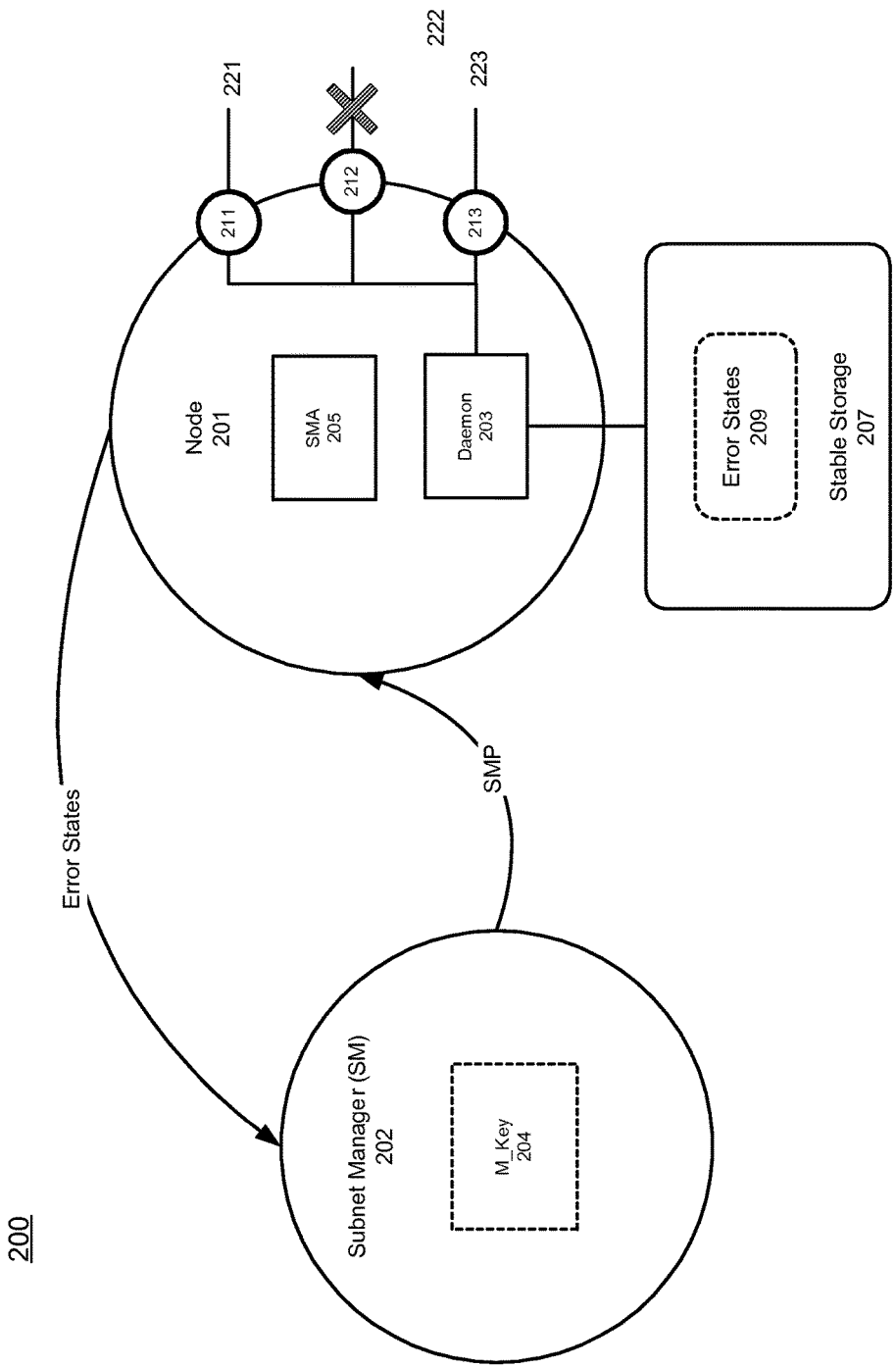
FIG. 2 shows an illustration of supporting automatic disabling of degraded links in a middleware environment in accordance with an embodiment of the invention.

FIG. 2 shows an illustration of supporting automatic disabling of degraded links in a middleware environment in accordance with an embodiment of the invention. As shown in FIG. 2, a fabric 200 includes a SM 202. At least one node 201 in the fabric 200 can have one or more ports 211-213, each of which is associated with one or more links 221-223. In the example as shown in FIG. 2, a link 222 associated with the port 212 on the node 201 is degraded.

A daemon 203 can be used on the node 201 to constantly monitor the symbol error and other error conditions associated with local links associated with the one or more ports 211-213. The node can perform a disable operation on the link if the various error rates exceed a configurable threshold during a configurable time interval. Such a disable operation can be reported to the SM 202, e.g. via conventional system management interfaces. A disable error state 209 can be explicitly recorded in a local stable storage 207, so that the link can avoid being unconditionally enabled again following a reset of the node 201. In one example, a configurable policy can be defined to remove the disable error state 209 following a reset of the node 201.

Instead of performing a local unconditional disable operation for the local port/link, the error state 209 can be recorded and made available to the SM 202 via subnet management traps, or be observable via SMP based methods, e.g. via extending the set of SMA attributes associated with the port. The SM 202 can observe the port error states using the designated SMP methods, e.g. using an extension to the normal subnet sweep operations. Also, the SM 202 can observe the port error state as a result of receiving the corresponding SMPs.

When the SM 202 detects a port 212 with an excessive error rate attribute set, the SM 202 can consider the corresponding link 222 as not operational in terms of being used by normal data traffic. The SM can still use this link for further discovery and other subnet management operations. However, the SM 202 is prevented from performing further discovery beyond the remote side of the relevant link in the case of a non-operational link, a not fully responsive remote SMA, or an unknown remote M_Key.

Furthermore, the SM 202 can leave/set the link 222 in a basic state, which allows SMP traffic and prevents both data traffic and non-SMP based management traffic. In this case, the link 222 can be tested using SMP based traffic in addition to be used for SMP based management operations. Testing can be initiated by the SM 202, or can be carried out by daemons 203 associated with the involved nodes, or by another centralized management entity.

Additionally, the SM 202 can enable the link 222 for normal data traffic for certain specific purposes. For example, non-SMP based traffic can be used to achieve higher levels of load/stress of the link for providing more elaborate stress testing of the link 222. Also, the link 222 can be used for other non-SMP based management traffic, such as the management traffic using general management packet (GMP) type MADs or higher level protocols like internet protocol over InfiniBand (IPoIB), in order to facilitate generic communication between any management entities associated with the various nodes. In these cases, the SM 202 may not include the link in the set of links through which normal data traffic is routed.

When the link is physically down and then comes back again, e.g. due to a cable replacement, the SM 202 can require a specific test procedure to be carried out for the link before the SM can fully include the link in the subnet. Such testing can be implemented by per node daemons 203 or by the SM 202 or by another centralized management entity. Then, the test procedure can be coordinated via additional SMP based methods and attributes associated with each port. When further testing shows a significantly improved error rate, the port attribute indicating excessive errors can be reset, and the SM 202 can then again include the link in the subnet topology for normal data traffic without any constraints.

Figure 3:
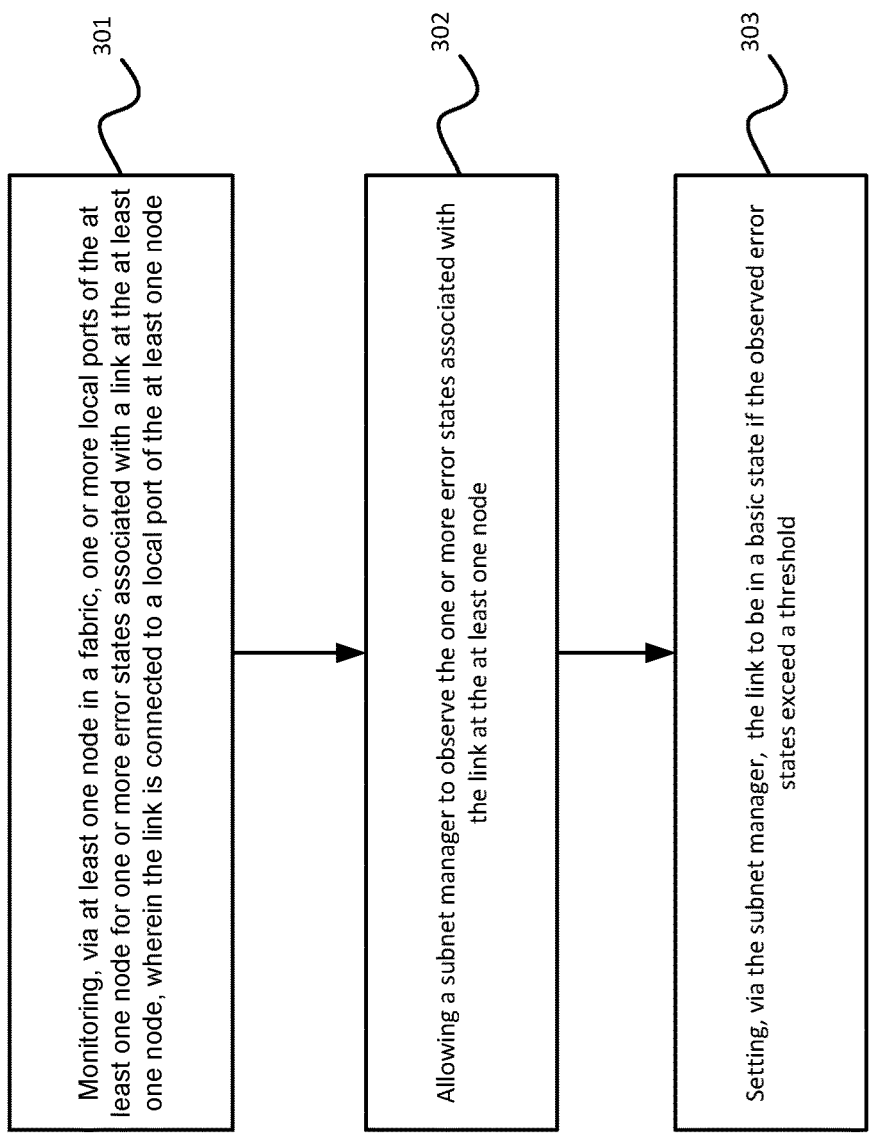
FIG. 3 illustrates an exemplary flow chart for alleviating network instability in a middleware environment in accordance with an embodiment of the invention.

FIG. 3 illustrates an exemplary flow chart for alleviating network instability in a middleware environment in accordance with an embodiment of the invention. As shown in FIG. 3, at step 301, at least one node in a fabric can monitor one or more local ports of the at least one node for one or more error states associated with a link at the at least one node, wherein the link is connected to a local port of the at least one node. Then, at step 302, a subnet manager can observe the one or more error states associated with the link at the at least one node. Finally, at step 303, the subnet manager can set the link to be in a basic state if the observed error states exceed a threshold.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting automatic disabling of degraded links in a fabric network that includes a subnet manager (SM) and a plurality of network nodes, the method comprising:
   monitoring, via a daemon process on a first network node in the fabric network, a local port of the first network node for one or more errors, wherein the one or more errors are associated with a link that connects the first network node and a second network node in the fabric network, wherein the link is in a first state and is configured to transfer both normal data and subnet management packet (SMP) data;
   in response to the one or more errors exceeding a configurable threshold, performing, by the daemon process, a disabling operation on the link to put the link into a second state, wherein the link in the second state is configured to transfer only SMP data;
   recording, by the daemon process, the state of the link in a persistent storage, wherein the recorded state is configured to prevent the link from being automatically enabled when the first network node is reset; and
   sending, via the link, one or more SMP messages to the subnet manager, wherein the one or more management data messages indicate that the link is disabled;
   wherein the subnet manager, upon receiving the one or more management data messages, operates to
   use the link to perform further discovery in the second network node,
   invoke the daemon process to initiate a test on the link,
   determine that errors at the local port of the first network node have dropped below the configurable threshold, and
   change the link from the second state to the first state; and
   wherein the daemon process, in response to the state change of the link from the second state to the first state, operates to remove the recorded state from the persistence storage when the first network node is reset.

2. The method according to claim 1, further comprising: requesting, via the subnet manager, the disabled link to be enabled.

3. The method according to claim 1, further comprising: observing, via the subnet manager, the one or more errors using subnet management packet (SMP) methods.

4. The method according to claim 1, further comprising: including, via the subnet manager, the enabled link in a subnet topology.

5. The method according to claim 1, wherein the fabric network is an InfiniBand network that includes a plurality of subnets.

6. The method according to claim 1, wherein the fabric network specifies one or more policies for defining a link in a non-routable state for observing errors.

7. The method according to claim 1, where an automated logic is used to determine whether the one or more errors exceeds the configurable threshold.

8. A non-transitory machine readable storage medium having instructions stored thereon that when executed cause a system to perform the steps comprising:
   monitoring, via a daemon process on a first network node in the fabric network, a local port of the first network node for one or more errors, wherein the one or more errors are associated with a link that connects the first network node and a second network node in the fabric network, wherein the link is in a first state and is configured to transfer both normal data and subnet management packet (SMP) data;

in response to the one or more errors exceeding a configurable threshold, performing, by the daemon process, a disabling operation on the link to put the link into a second state, wherein the link in the second state is configured to transfer only SMP data;

recording, by the daemon process, the state of the link in a persistent storage, wherein the recorded state is configured to prevent the link from being automatically enabled when the first network node is reset; and sending, via the link, one or more SMP messages to the subnet manager, wherein the one or more management data messages indicate that the link is disabled;

wherein the subnet manager, upon receiving the one or more management data messages, operates to
use the link to perform further discovery in the second network node,
invoke the daemon process to initiate a test on the link,
determine that errors at the local port of the first network node have dropped below the configurable threshold, and
change the link from the second state to the first state; and wherein the daemon process, in response to the state change of the link from the second state to the first state, operates to remove the recorded state from the persistence storage when the first network node is reset.

9. The non-transitory machine readable storage medium according to claim 8, wherein the fabric network is an InfiniBand network that includes a plurality of subnets.

10. The non-transitory machine readable storage medium according to claim 8, wherein the network node operates to request the disabled link to be enabled.

11. The non-transitory machine readable storage medium according to claim 8, wherein the subnet manager observes the one or more errors using subnet management packet (SMP) methods.

12. The non-transitory machine readable storage medium according to claim 8, wherein the subnet manager operates to include the enabled link in a subnet topology.

13. The non-transitory machine readable storage medium according to claim 8, wherein the fabric network specifies one or more policies for defining a link in a non-routable state for observing errors.

14. A system for supporting automatic disabling of degraded links in a network, comprising:
a computer one or more microprocessors;
a fabric network executing on the computer, wherein the fabric network includes a first network node and a second network node, wherein the first network node includes a daemon process configured to
monitor a local port of the network node for one or more errors associated with a link that connects the first network node and the second network node, wherein the link is in a first state and is configured to transfer both normal data and subnet management packet (SMP) data,
perform a disabling operation on the link to put the link into a second state, in response to the one or more errors exceeding a configurable threshold, wherein the link in the second state is configured to transfer only SMP data, and
record the state of the link in a persistent storage, wherein the recorded state is configured to prevent the link from being automatically enabled when the network node is reset; and
a subnet manager in the fabric network, wherein the subnet manager operates to receive, via the link, one or more management data messages from the first network node, wherein the one or more management data messages indicate that the link is disabled;
wherein the managing node, upon receiving the one or more management data messages, operates to
use the link to perform further discovery in the second network node,
invoke the daemon process to initiate a test on the link,
determine that errors at the local port of the first network node have dropped below the configurable threshold, and
change the link from the second state to the first state; and
wherein the daemon process, in response to the state change of the link from the second state to the first state, operates to remove the recorded state from the persistence storage when the first network node is reset.

15. The system according to claim 14, wherein the network node operates to request the disabled link to be enabled.

16. The system according to claim 14, wherein the subnet manager operates to include the enabled link in a subnet topology.

17. The system according to claim 14, wherein the fabric network is an InfiniBand network that includes a plurality of subnets.

18. The system according to claim 14, wherein the fabric network specifies one or more policies for defining a link in a non-routable state for observing errors.

19. The system according to claim 14, where an automated logic is used to determine whether the one or more errors exceeds the configurable threshold.

* * * * *

UNITED STATES PATENT AND TRADEMARK OFFICE
CERTIFICATE OF CORRECTION

PATENT NO. : 9,900,293 B2
APPLICATION NO. : 13/488250
DATED : February 20, 2018
INVENTOR(S) : Johnsen et al.

It is certified that error appears in the above-identified patent and that said Letters Patent is hereby corrected as shown below:

On the Title Page

On page 3, Column 2, under Other Publications, Line 23, delete "(exerpt)," and insert -- (excerpt), --, therefor.

In the Drawings

On sheet 1 of 3, in FIGURE 1, Line 1, delete "Con nectivity" and insert -- Connectivity --, therefor.

On sheet 1 of 3, in FIGURE 1, Line 2, delete "Conn ectivity" and insert -- Connectivity --, therefor.

In the Specification

In Column 1, Line 43, delete "Forschungszcntrum" and insert -- Forschungszentrum --, therefor.

Signed and Sealed this
Fourteenth Day of August, 2018

Andrei Iancu
*Director of the United States Patent and Trademark Office*